INVENTOR:
ROY F. SCHWEGLER
BY Emerson B Donnell
ATTORNEY

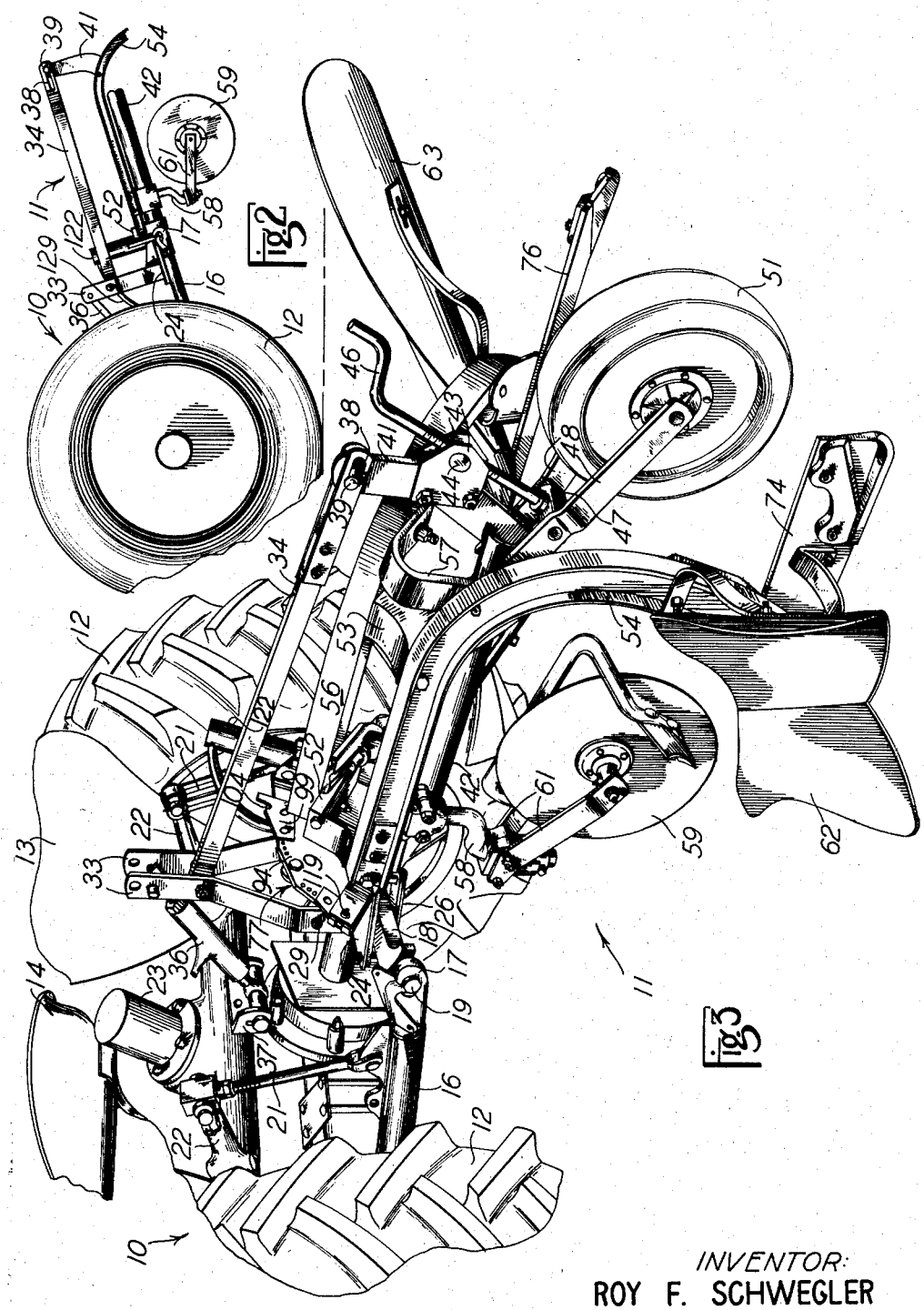

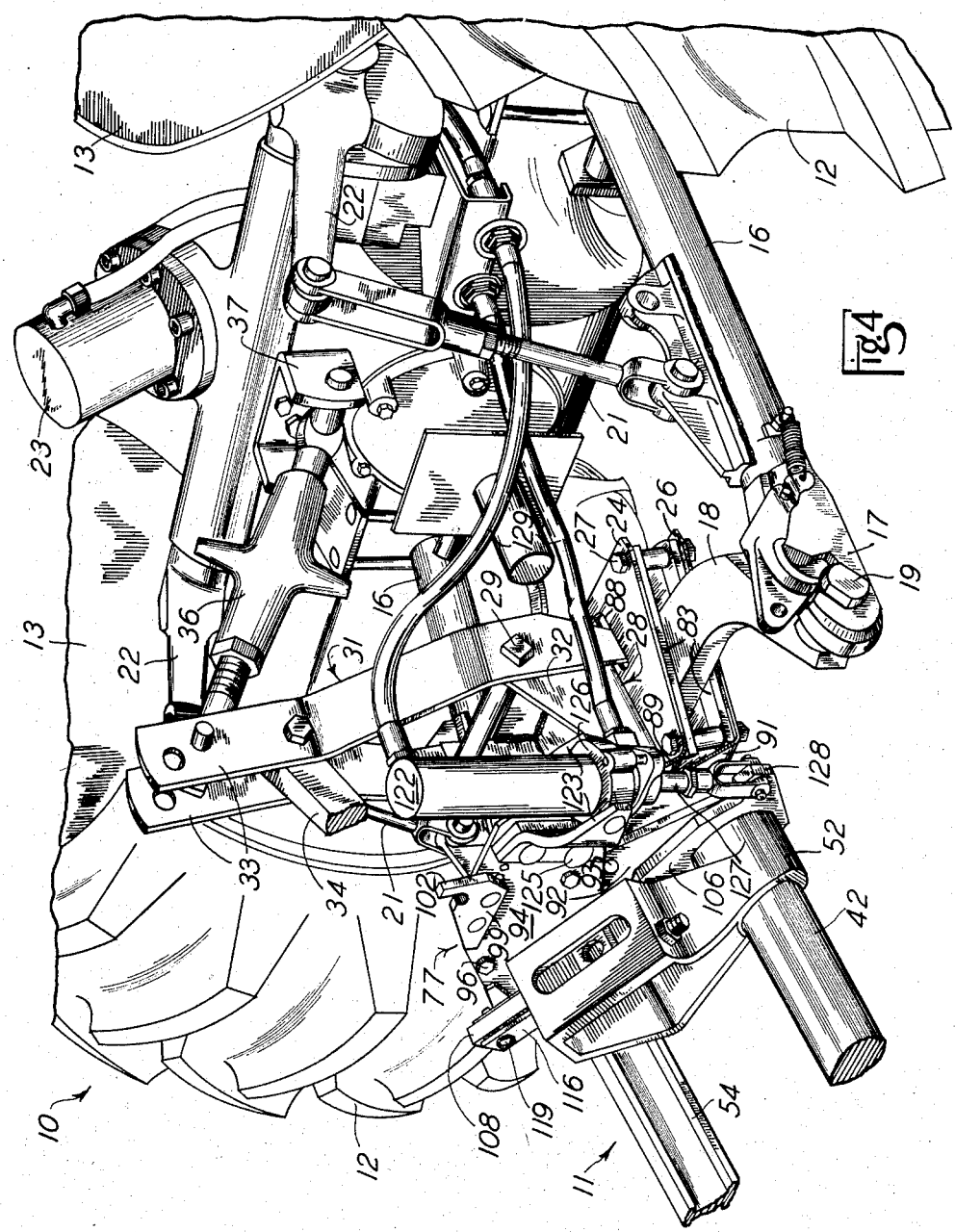

Jan. 13, 1959 R. F. SCHWEGLER 2,868,307
TWO-WAY PLOW
Filed Dec. 10, 1954 6 Sheets-Sheet 4
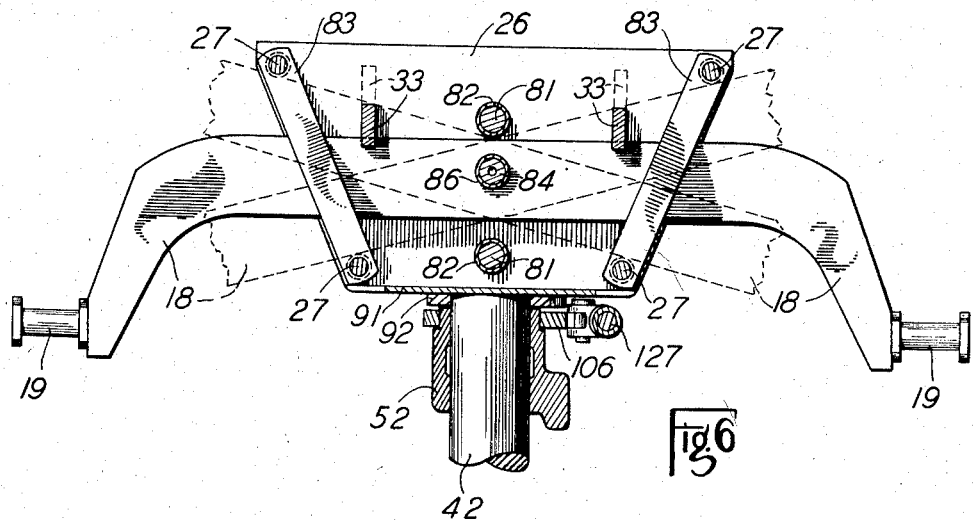
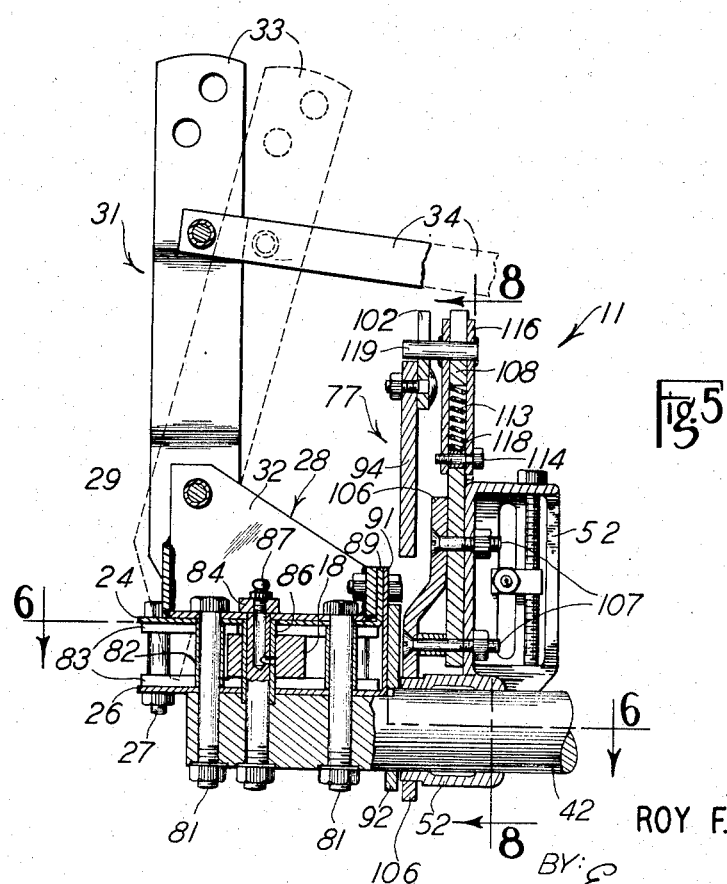
INVENTOR:
ROY F. SCHWEGLER
BY Emerson B Donnell
ATTORNEY

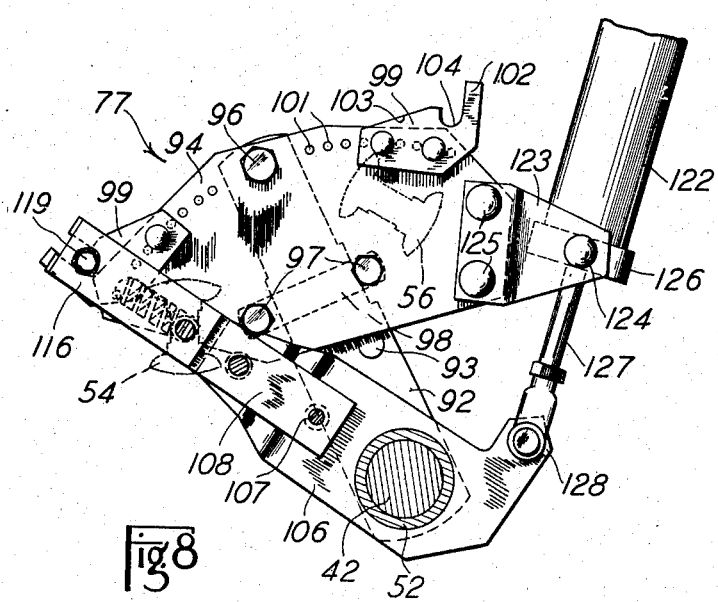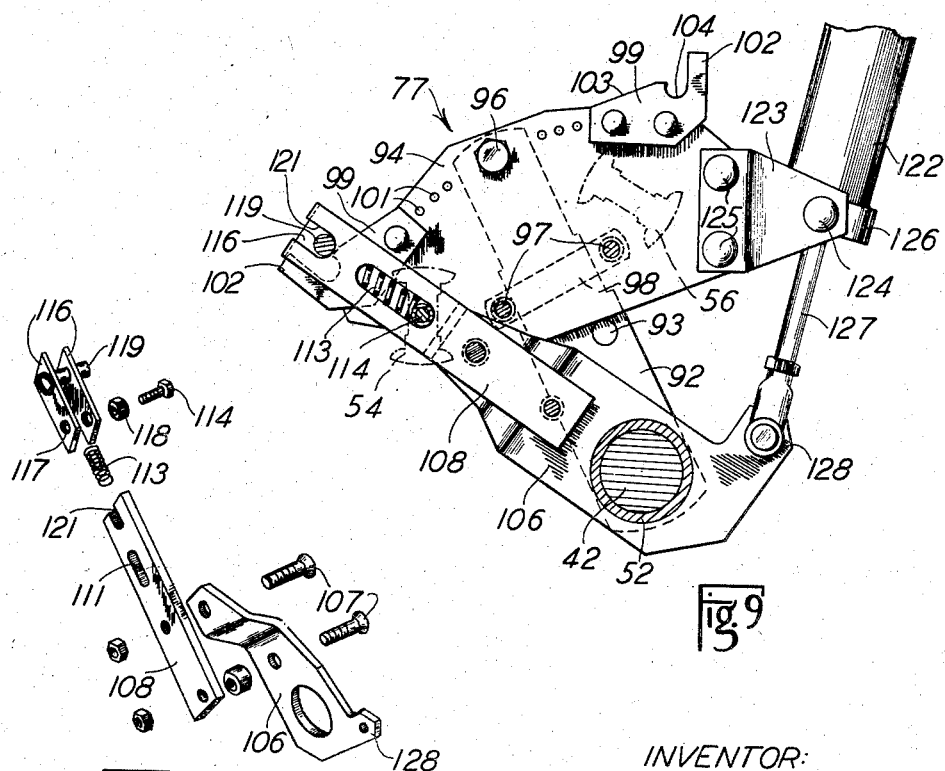

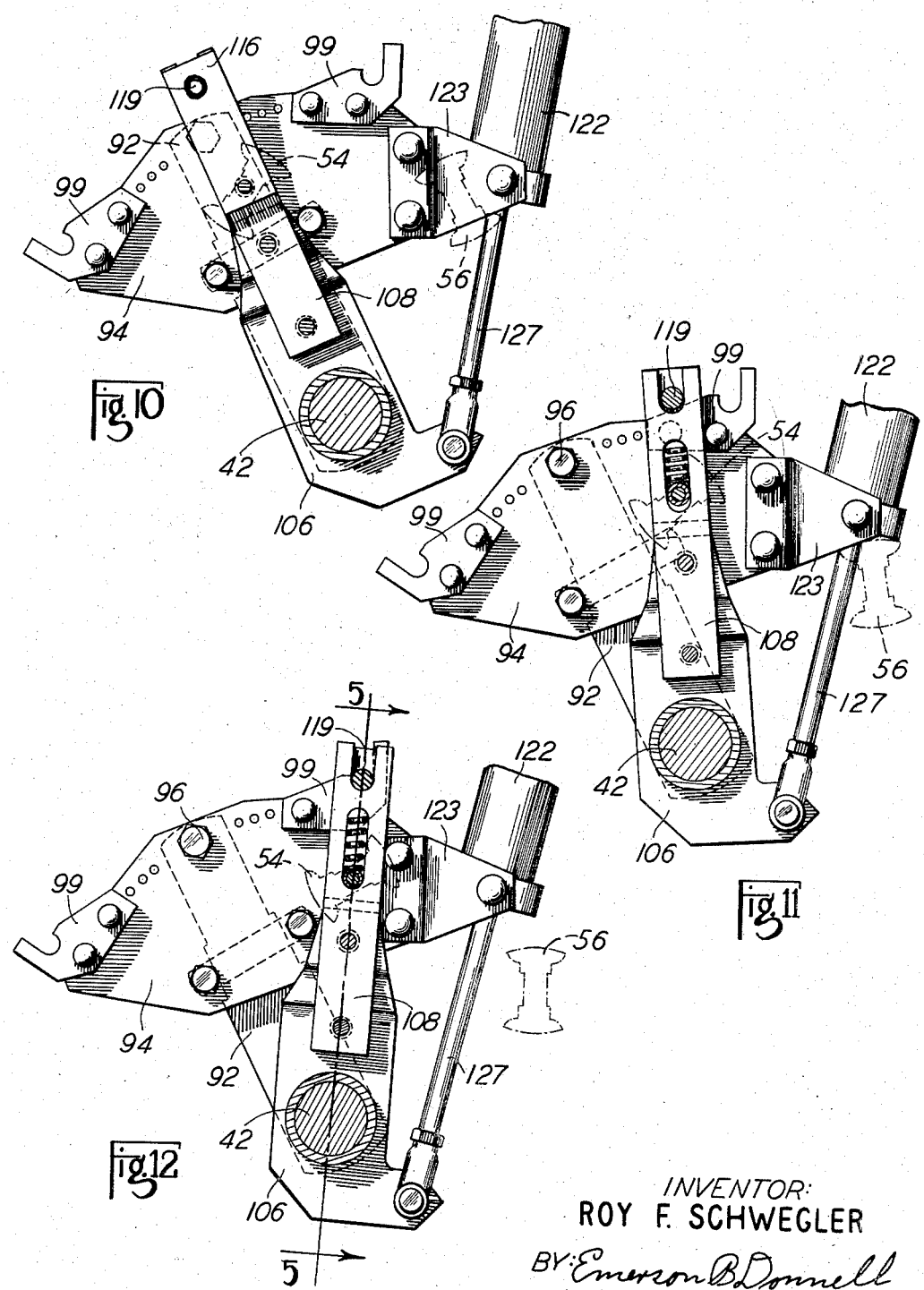

United States Patent Office 2,868,307
Patented Jan. 13, 1959

2,868,307

TWO-WAY PLOW

Roy F. Schwegler, Davenport, Iowa, assignor to J. I. Case Company, Racine, Wis., a corporation of Wisconsin Application December 10, 1954, Serial No. 474,426

5 Claims. (Cl. 172—225)

This invention relates to plows, and, more specifically, it relates to a two-way plow which is pivotal while plowing and also stable during transport.

An object of this invention is to provide a two-way plow which can be easily and efficiently adjusted for two-way plowing.

Another object of this invention is to provide a plow which is adjustable for two-way plowing and prevents the forces of plowing from being transmitted to the adjusting means. Another object of this invention is to provide a two-way plow which is pivotal in its plowing action.

Still another object is to provide a plow which is pivotal during plowing and stable in the raised transport position. Among other things, this provides accurate and safe plowing on hillsides permitting complete control of the plow and avoiding the danger of a plow tipping the tractor when the plow is raised on a hillside.

A further object is to provide a plow which is easily lifted out of the ground when the plow is in operation. This object is accomplished by having the plow free to assume an angle which will allow the plow to cut its way free from the ground.

Other objects and advantages will become apparent upon reading the following description in light of the accompanying drawings, wherein, Fig. 1 is a side perspective view of a fragment of a tractor having attached thereto a preferred embodiment of a plow of this invention.

Fig. 2 is a reduced diagrammatic view similar to that of Fig. 1 but showing only a fragment of the plow and showing it in a raised position.

Fig. 3 is a side perspective view of a plow slightly modified from that shown in Fig. 1 since the rear end of the plow is modified.

Fig. 4 is an enlarged side perspective view of the plow shown in the previous views but with parts broken away and shown from the opposite side.

Fig. 5 is a sectional view on the longitudinal center line of the plow showing the front end thereof with the section line located on line 5—5 of Fig. 12.

Fig. 6 is a sectional view taken on the line 6—6 of Fig. 5 showing parts thereof in different positions with dotted lines.

Fig. 7 is an exploded view of certain parts of the plow.

Figs. 8 through 12 are rear sectional views of a fragment of the plow in different operating positions on line 8—8 of Fig. 5.

Similar reference numerals refer to similar parts throughout the views.

Figure 1:
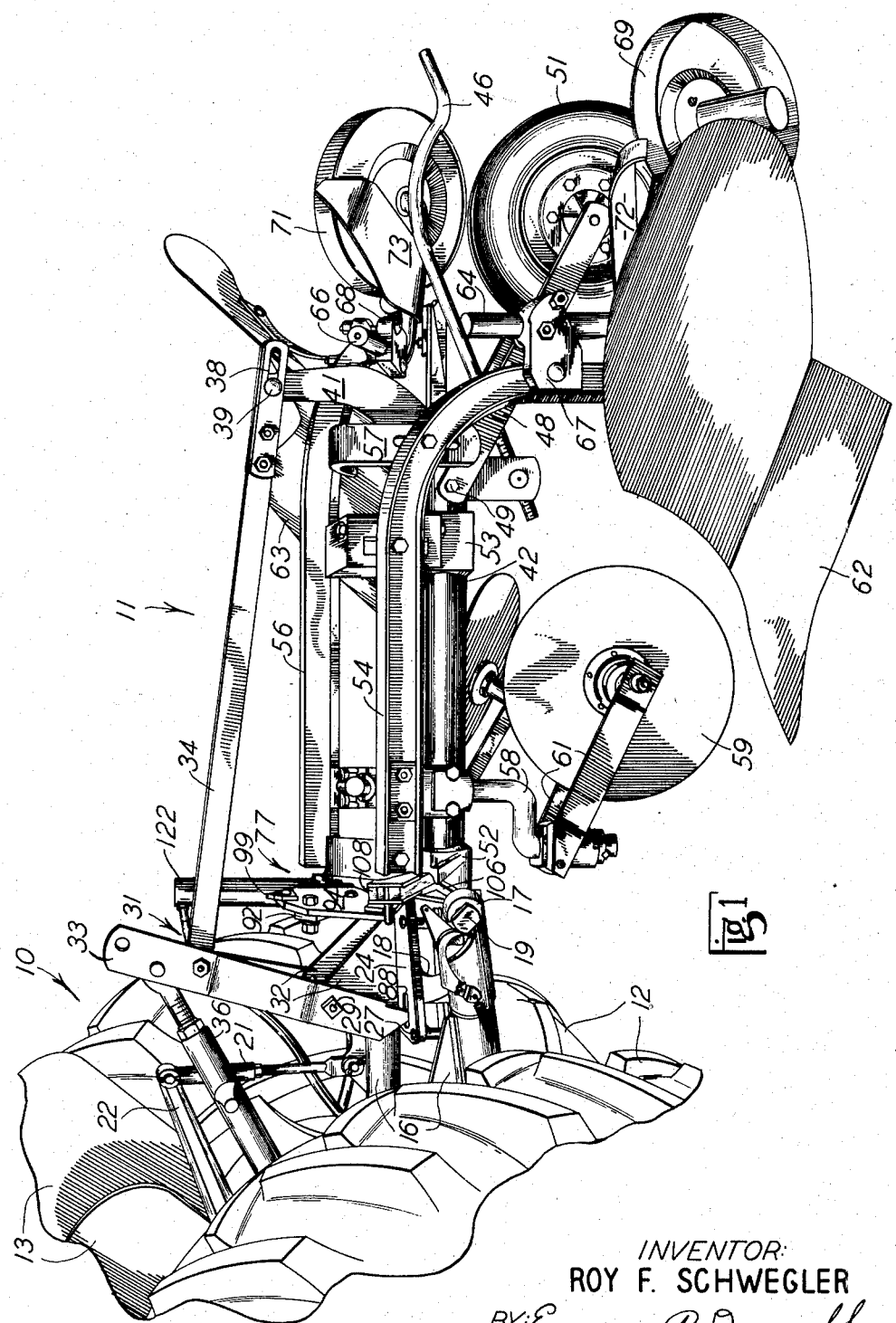

Figs. 1 and 3 show a tractor 10 with a plow 11 attached to the rear of the tractor in the usual operating position.

The tractor is of a conventional construction having a pair of rear wheels 12 and corresponding fenders 13 with the usual intermediate operator's seat 14. Extending substantially horizontally rearwardly from the tractor is a pair of hitch arms, such as the arm 16 which terminates in a latch 17. Through this construction, a bifurcated drawbar 18 (see Fig. 6) is secured to the tractor by means of two pins, such as the pin 19, engaged by the latches 17. Also, links 21 are pivotally attached to the arms 16 to extend upwardly and attach to arms 22 which are powered to pivot in a vertical plane by a hydraulic cylinder 23. Thus, the arms 16 are hydraulically raised and lowered in a well-known manner of tractor operation. Accordingly, the drawbar and the plow are raised and lowered as hereinafter described. The raised position is shown in Fig. 2.

Centrally attached above and below the drawbar 18 is a pair of draft plates 24 and 26 secured by a bolt 27 vertically attached between each of the four corners of the plates. See Figs. 4 and 6. In a manner more fully described later, the plates 24 and 26 pivot horizontally on the drawbar 18 within the limits of the bolts 27 to make the plow pivotal. A bifurcated plate 28 is suitably bolted to the top plate 24 to provide spaced apart vertical sections 32 for mounting a horizontally disposed rod 29. A mast 31 is pivotally attached to the plates 32 at each end of the rod through a pair of mast upright arms 33 which attach at their upper ends to a rearwardly extending brace 34 and to a turnbuckle 36. Both the brace 34 and the turnbuckle 36 are pivotally attached between the upper ends of the arms 33 with the turnbuckle pivotally attached to the tractor 10 through a tractor bracket 37. The rear end of the brace 34 contains a slot 38 to engage a horizontally disposed pin 39 in the top of an upright arm 41 attached to the rear of the plow 11. Between Figs. 1 and 3, the arm 41 is slightly different in form but serves the same purpose in that it is attached at its lower end to the rear end of a horizontally and longitudinally extending plow frame or axle 42. The latter is suitably attached at its front end to the draft plates 24 and 26, as described later, and is preferably circular on its exterior.

Fig. 3 further shows a pair of plates 43 attached to the arm 41 to pivotally secure a threaded nut 44 between the plates. A crank 46 threadedly engages the nut to extend below to a connector 47 which is pivotally mounted between a pair of arms 48 pivotally attached at 49 to the rear end of the axle 42. The opposite ends of the arms 48 rotatably receive a gage wheel 51 which rides on the unplowed ground to govern the penetration of the plow into the ground. The wheel 51 is, of course, vertically adjustable through the crank 46 to vary the amount of plow penetration. At this time it is mentioned that the axle 42 and the wheel 51 are mounted in a non-rotatable position while the other parts of the plow rotate about the axle.

Suitably rotatably mounted on the front end of the axle 42, in a manner described later, is a mounting bearing 52 with a bearing 53 also rotatably mounted on the axle 42 but at the rear end thereof. The bearings 52 and 53 have two beams 54 and 56 suitably bolted thereto to extend rearwardly on the plow 11, as shown. A curved brace 57 is bolted between the beams 54 and 56, the whole constituting a rockable beam frame or assembly. The forward end of the beam 54 has a coulter standard 58 bolted to it to rotatably support a coulter wheel 59 attached to the standard by a pair of arms 61. The beam 56 similarly has a coulter wheel 62 attached to it so that the beams each have a coulter wheel attached to depend from the beam in the plane of the direction of movement of the plow. Also attached to the beams 54 and 56 are moldboard type of plow bottoms 62 and 63 which are preferably bolted to the trailing ends of the beams and faced away from each other. Fig. 1 shows furrow wheel standards 64 and 66, respectively bolted to the beams 54 and 56 through brackets 67 and 68 to rotatably mount furrow wheel 69 and 71 behind the respective plow bottoms. Scrapers 72 and 73 are also preferably attached to the standards 64 and 66 to extend to the furrow wheels 69 and 71, respectively.

Fig. 3 shows a modification of the rear end of the plow 11 in that the trailing ends of the beams 54 and 56 are provided with landsides 74 and 76 attached to the plow beams and the inside of the plow bottoms, as shown. Of course, the furrow wheels 69 and 71 and the landsides 74 and 76 are positioned to ride in the furrows formed by the plow bottoms 62 and 63 to counter the side thrust of plowing. In each embodiment, the gage wheel supports the plow upwardly against the tendency of the plow bottom to dig down into the ground.

Through indexing mechanism 77, hereinafter described, the plow beams 54 and 56 can be rotated about the axle 42 to position either one of the plow bottoms 62 and 63 on the ground for plowing. Figs. 1 and 3 show the plow bottom 62 in the plowing position with the plow bottom 63 offset and raised out of the plowing position. The gage wheel 51 is then engaged with the top of the unplowed ground in the usual and well-known manner. With this arrangement, the plow is used to form a furrow in one direction of travel. When the end of the furrow is reached, the powered tractor arms 16 and the mast 31 raise the plow off the ground to the position shown in Fig. 2. Then the indexing mechanism 77 is operated to rotate the plow beam 54 upwardly and the plow beam 56 downwardly to where the latter is in plowing position when the plow 11 is again positioned on the ground. The tractor has then been turned around to return in the direction of the furrow but this time with the plow bottom 63 doing the plowing but off to the same side as the side of the plowing done by the bottom 62.

As shown in Figs. 5 and 6, the axle 42 extends to the front of the plow 11 where bolts 81 are vertically positioned to secure plates 24 and 26 above the axle. Each bolt 81 has a spacer 82 which maintains the plates 24 and 26 apart. Also, other spacers are preferably employed on the bolts 27 to maintain straps 83 spaced apart within plates 24 and 26 with the straps extended between the bolts 27. It should be noted that the drawbar 18 is horizontally disposed between the plates 24 and 26 to permit the straps 83 to slide on the top and the bottom surfaces of the drawbar in the pivot of the plow 11. Intermediate the bolts 81 is a pivot bolt 84, with a spacer 86, vertically disposed to project through the axle 42, and the plates, and the drawbar 18. A grease fitting 87 is preferably provided on the pivot 84. Thus, it should be understood that the tractor pulls the plow 11 through the fixedly attached drawbar 18. The draft force is transmitted from the drawbar to the plow frame 42 through the pivot 84, and, therefore, the plow 11 is pivotal with respect to the tractor since the frame 42 can pivot with respect to the drawbar 18 and within the limits of the bolts 27. Fig. 6 shows the amount of pivot of the plow frame with respect to the drawbar 18. The latter is shown fragmentarily in dotted lines in the two extreme positions of pivot. Of course, the drawbar does not pivot but rather the frame pivots and the view thus shows the relative positions between them.

When the plow 11 is raised, the mast 31 pivots about the rod 29 to move the mast upper end toward the tractor 10 and the mast lower end toward the drawbar 18. This action is shown in Fig. 5 wherein the dotted lines of the mast are the plowing position of the plow and the solid lines are the raised position of the plow. The upper end of the mast is, of course, confined by the turnbuckle 36 which draws the mast upper end, and the mast brace 34, toward the tractor. In the action, the rear end of the brace slides over the arm 41 on the rear end of the plow by virtue of the brace slot 38. Fig. 6 shows the dotted position of the lower end of the mast arms 33 and the solid line position is also shown. Since the lower ends of the arms 33 abut the drawbar 18 on opposite sides of the pivot 84, the drawbar plates are maintained rigid with the drawbar and there can be no pivoting of the plow in the raised position. To accomplish this, Fig. 4 best shows the lower ends of the mast arms 33 each projected through a slot 88 in the drawbar upper plate 24. Actually, the lower ends of the arms 33 are notched to nest with the corner of the drawbar as shown in Figs. 5 and 6.

Referring again to the indexing mechanism 77, it will be noted, particularly in Fig. 5, that the rear ends of the plates 24 and 26 are continued upwardly in sections 89 and 91, respectively. A bolt then secures the sections juxtaposed along with a similarly upturned section of the member 28. Figs. 4, 5, and 8 show a support arm 92 mounted on the axle 42 to extend upwardly and transversely therefrom. A pin 93 attaches the arm 92 to the upturned sections 89 and 91 of the draft plates 24 and 26. In this manner, the arm 92 is fixedly supported on the plow frame 42 and it is connected to an indexing plate 94 by a bolt 96. Since the bolt 96 is the only attachment between the arm and the plate, the latter is free to pivot with respect to the arm and the plow frame. However, a pair of bolts 97, as seen in Fig. 8, pass through the plate 94 and are spaced with one on each side of the arm 92 to limit the amount of plate pivot on the arm. To maintain the plate and the arm in parallel planes, a strap 98, shown dotted in Fig. 8, is connected between the bolts 97 and spaced from the plate 94 to allow the arm to extend between it and the plate.

The indexing plate 94 is preferably provided with a pair of stop plates or keepers 99 shown bolted to the plate 94 at each end thereof in Fig. 8. The plates 99 can be adjustably bolted to the plate 94 through the plurality of spaced holes 101 in the plate. Each plate includes a stop lug 102 and an inclined top or cam edge 103 with an intermediate notch 104.

Also mounted on the axle 42, but immediately behind the arm 92 and the indexing plate 94, is the mounting bearing and bracket 52. As shown in Figs. 5, 6 and 7 an offset arm 106 is mounted on the front end of the bracket 52 to extend upwardly to the rear of the indexing plate. The arm 106 and the bracket 52, are joined together by bolts 107 with an indexing pin support arm 108 secured between the two parts to extend above them. Of course, through bolts 107 in this manner all three of those parts are rotatable together on the axle 42.

The arms 106 and 108 are shown in an exploded perspective in Fig. 7. It will be noted that the pin arm 108 contains a slot 111, which, as shown in Fig. 9 receives a compression spring 113 and a bolt 114 which passes therethrough below the spring. The latter connects the lower ends of a pair of plates 116 which are thus disposed with one on each side of the arm 108 as the bolt 114 threads into a hole 117 in one of the plates 116. See Fig. 5. A spacer 118 is disposed on the bolt 114 between the plates 116 to permit the latter to be secure but slidable on the arm 108 within the limit imposed by the slot 111. With this arrangement, the spring 113 urges the plates 116 downwardly on the arm 108 to the bottom of the slot 111. The upper ends of the plates 116 support an indexing pin, latch or detent 119 which projects beyond one side of the plates as shown in Figs. 5 and 7. The pin 119 is received in a notch 121 in the end of the arm 108 to be guided therein.

With the foregoing described construction, it will be apparent that the indexing pin can be placed in a selected position with respect to the indexing plate as the bracket 52 and its parts are rotated on the axle 42. Thus, Fig. 8 shows the rear view of the indexing mechanism in a position which places the plow beam 54 downwardly for plowing and plow beam 56 upwardly, both as indicated by the dotted lines, and that position is the position in Figs. 1, 2, and 4. The indexing pin is then locked in the indexing notch as shown.

When it is desired to change the position of the plow beams, the indexing pin is released and the beams are rotated. To accomplish this, a hydraulic cylinder 122 is mounted on the indexing mechanism as shown in Fig. 4. A pair of plates 123 is bolted by bolts 125 to the indexing plate 94 to rotatably support the cylinder 122 through two pins, such as the pin 124, attaching, with one on each side of the cylinder, to the plates 123 and a collar 126 of the cylinder 122. A piston rod 127 extends below the cylinder 122 to a bifurcated end which rotatably attaches to a projection 128 of the arm 106. The cylinder is powered from the tractor 10 through a pair of hoses 129 connected to the top and the bottom of the cylinder.

Thus, upon operating the cylinder 122, the rod 127 is extended from the cylinder and the indexing plate 94 is initially pivoted about the bolt 96 within the limits of the bolts 97 as shown between Figs. 8 and 9. In pivoting counter-clockwise as shown, the indexing plate notch is withdrawn to a position below the indexing pin and the latter is thus free of the plate. Continued operation of the cylinder, as that shown between Figs. 9 and 10, will rotate the arm 106, and the bracket 52, and consequently the plow beams 54 and 56, about the axle 42. As shown in Fig. 11, the rotation continues until the indexing pin engages the inclined edge 103 in the plate 99. The pin slides up the incline as the spring 113 is compressed to permit the pin to be raised. Fig. 12 then shows the indexing mechanism 77 when the pin is fully locked with the indexing plate by nesting in the notch 104 as the spring 113 urges the pin downwardly. The plow beam 56 is now in the lowered plowing position and the beam 54 is now in the raised position. The cylinder 122 maintains downward pressure on the arm 106 to retain the set position. Of course, the reverse action of withdrawing the rod 127 toward the cylinder will rotate the plow beams counter-clockwise toward the Fig. 8 position again.

While specific embodiments of this invention have been shown and described, it should be obvious that certain changes could be made therein, and, therefore, this invention should be limited only by the scope of the appended claims.

I claim:

1. In a two-way plow the combination of a frame supported for travel above the ground, a longitudinally disposed axle projecting rearwardly from the frame, a beam frame rockably carried on the axle, soil working elements on the beam frame circumferentially spaced thereabout, an indexing plate rockably supported from said axle, a detent carried on said beam frame outwardly of the margins of said plate and yieldingly urged toward said plate, stop plates on said indexing plate positioned to engage said detent and define the limits of rocking movement of said beam frame, an extensible fluid motor connected between said indexing plate and said beam frame for rocking said frame upon actuation of said motor, said motor, by virtue of its connection to said plate, causing rocking of said plate prior to rocking of said beam frame for disengaging said detent from one of said stop plates upon rocking of said indexing plate in one direction and from the other stop plate upon rocking of said indexing plate in the other direction.

2. In a two-way plow the combination of a frame supported for travel above the ground, a longitudinally disposed axle projecting rearwardly from the frame, a beam frame rockably carried on the axle, soil working elements on the beam frame circumferentially spaced thereabout, an indexing plate rockably supported from said axle and having spaced-apart notches thereon, a detent carried on said beam frame and yieldingly urged toward said plate and positioned to selectively engage said notches and define the limits of rocking movement of said beam frame, a fluid motor connected between said indexing plate and said beam frame for rocking said frame upon actuation of said motor, said motor, by virtue of its connection to said plate causing rocking of said plate prior to rocking of said beam frame for disengaging said detent from one of said notches upon rocking of said indexing plate in one direction and from the other of said notches upon rocking of said indexing plate in the other direction.

3. In a two-way plow the combination of a frame supported for travel above the ground, a longitudinally disposed axle projecting rearwardly from the frame, a beam frame rockably carried on the axle, soil working elements on the beam frame circumferentially spaced thereabout, an indexing member rockable supported from said axle, a detent carried on said beam frame, stop elements on said indexing member, said detent and said stop elements being positioned to selectively interengage and define the limits of rocking movement of said beam frame, a fluid motor connected between said indexing member and said beam frame for rocking of said frame upon actuation of said motor, said motor, by virtue of its connection to said indexing member, causing rocking of said member prior to rocking of said beam frame, and means on said indexing member and engageable with said axle for limiting rocking of said indexing member with respect to said axle for disengaging said stop elements from said detent at one limit of rocking movement of said beam frame, upon rocking of said indexing member in one direction, and for disengaging said stop elements at the other limit of rocking movement of said beam frame upon rocking of said indexing member in the other direction.

4. In a two-way plow the combination of a frame supported for travel above the ground, a longitudinally disposed axle projecting rearwardly from the frame, a beam frame rockably carried on the axle, soil working elements on the beam frame circumferentially spaced thereabout, an indexing plate rockably supported from said axle, a detent element carried on said beam frame, keeper elements on said indexing plate positioned to engage said detent and define limits of rocking movement of said beam frame, a fluid motor connected between said indexing plate and said beam frame for rocking said frame upon actuation of said motor, said motor, by virtue of its connection to said plate causing rocking of said plate prior to rocking of said beam frame for disengaging said keeper elements at one limit of rocking movement of said beam frame, upon rocking of said indexing plate in one direction, and for disengaging said keeper elements at the other limit of rocking movement of said beam frame upon rocking of said indexing plate in the other direction.

5. In a two-way plow the combination of a frame supported for travel above the ground, a beam frame supported from said frame for rocking movement about a longitudinal axis, soil working elements on the beam frame, an indexing plate supported for rocking movement relatively to said frame, a fluid motor connected between said plate and said beam frame, whereby to rock said plate in one direction and said beam frame in the other direction upon actuation of said motor, and motion limiting means engageable between said beam frame and said plate for locking said beam frame to said plate and adapted to be disabled by rocking of said plate by actuation of said motor.

References Cited in the file of this patent

UNITED STATES PATENTS

| | | |
|---|---|---|
| 1,529,425 | Ferguson | Mar. 10, 1925 |
| 2,109,677 | Markoski | Mar. 1, 1938 |
| 2,611,304 | Toland | Sept. 23, 1952 |
| 2,633,786 | Pursche | Apr. 7, 1953 |
| 2,633,787 | Nelson | Apr. 7, 1953 |
| 2,685,242 | Rusco | Aug. 3, 1954 |
| 2,698,563 | Edwards | Jan. 4, 1955 |
| 2,708,396 | Newhouse et al. | May 17, 1955 |
| 2,750,863 | Miller et al. | June 19, 1956 |

FOREIGN PATENTS

| | | |
|---|---|---|
| 608,130 | Great Britain | Sept. 10, 1948 |
| 665,663 | Great Britain | Jan. 30, 1952 |
| 837,329 | Germany | Apr. 21, 1952 |